(12) United States Patent
Somaya et al.

(10) Patent No.: US 10,733,626 B2
(45) Date of Patent: Aug. 4, 2020

(54) SYSTEM AND METHOD FOR REAL-TIME GENERATION OF SEGMENTS FOR A COMPUTERIZED DECISION SYSTEM

(71) Applicant: Disney Enterprises, Inc., Burbank, CA (US)

(72) Inventors: Vikram Somaya, Burbank, CA (US); Ajit Kumar Srivastava, Monmouth Junction, NJ (US); Molly Parr, Burbank, CA (US); Sophie M. Coleman, Burbank, CA (US); Christen Johnson Chattleton, Burbank, CA (US); Scott T. Keating, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 307 days.

(21) Appl. No.: 15/719,866

(22) Filed: Sep. 29, 2017

(65) Prior Publication Data

US 2018/0096385 A1     Apr. 5, 2018

Related U.S. Application Data

(60) Provisional application No. 62/402,912, filed on Sep. 30, 2016.

(51) Int. Cl.
*G06Q 30/00*     (2012.01)
*G06Q 30/02*     (2012.01)
*G06Q 30/06*     (2012.01)

(52) U.S. Cl.
CPC ..... *G06Q 30/0251* (2013.01); *G06Q 30/0631* (2013.01)

(58) Field of Classification Search
CPC .................................................... G06Q 30/20
USPC ........................... 705/14.49, 14.73, 37, 14.4
See application file for complete search history.

(56) References Cited

U.S. PATENT DOCUMENTS

| | | |
|---|---|---|
| 5,848,396 A | 12/1998 | Gerace |
| 5,991,735 A | 11/1999 | Gerace |
| 7,496,943 B1 | 2/2009 | Goldberg et al. |
| 8,391,773 B2 | 3/2013 | Arseneau et al. |
| RE44,566 E | 10/2013 | Goldberg et al. |
| 8,595,763 B1 | 11/2013 | Packard et al. |
| 8,862,499 B2 | 10/2014 | Kamei et al. |
| 9,050,537 B2 | 6/2015 | Packard et al. |
| 9,056,253 B2 | 6/2015 | Thompson et al. |
| 9,138,652 B1 | 9/2015 | Thompson et al. |
| 9,386,355 B2 | 7/2016 | Packard et al. |
| 2001/0014868 A1 | 8/2001 | Herz et al. |

(Continued)

*Primary Examiner* — Sun M Li
(74) *Attorney, Agent, or Firm* — McCormick, Paulding & Huber PLLC

(57) ABSTRACT

A system and method for real-time generation of segments for a computerized decision system provides an event segment list to a decision engine. The event segment list is generated based on consumer affinities determined from consumer data and modeled data on that consumer's consumption and geo-location. The consumer affinities are used in a query to obtain current events related to the consumer's affinities. The current events are associated with generic events, which together are included in the event segment list, which is delivered to the decision engine and used to make a decision based on the event segment list and specified decision criteria.

18 Claims, 5 Drawing Sheets

(56) References Cited

U.S. PATENT DOCUMENTS

| | | | |
|---|---|---|---|
| 2002/0124249 A1 | 9/2002 | Shintani et al. | |
| 2003/0149975 A1 | 8/2003 | Eldering et al. | |
| 2003/0172376 A1 | 9/2003 | Coffin, III | |
| 2005/0096978 A1 | 5/2005 | Black | |
| 2005/0154637 A1 | 7/2005 | Nair et al. | |
| 2005/0216932 A1 | 9/2005 | Danker | |
| 2005/0262024 A1 | 11/2005 | Headings et al. | |
| 2006/0253330 A1 | 11/2006 | Maggio et al. | |
| 2006/0282319 A1 | 12/2006 | Maggio | |
| 2007/0233569 A1 | 10/2007 | Kelley et al. | |
| 2008/0060000 A1 | 3/2008 | Drouet et al. | |
| 2008/0189215 A1 | 8/2008 | Travez et al. | |
| 2009/0094113 A1 | 4/2009 | Berry et al. | |
| 2009/0132071 A1 | 5/2009 | Phillip | |
| 2010/0057527 A1 | 3/2010 | Robert | |
| 2010/0205049 A1 | 8/2010 | Long et al. | |
| 2011/0202397 A1 | 8/2011 | Lam et al. | |
| 2011/0212756 A1 | 9/2011 | Packard et al. | |
| 2012/0005209 A1* | 1/2012 | Rinearson | G06Q 30/02 707/737 |
| 2013/0066725 A1 | 3/2013 | Umeda | |
| 2014/0062696 A1 | 3/2014 | Packard et al. | |
| 2014/0067939 A1 | 3/2014 | Packard et al. | |
| 2014/0068663 A1 | 3/2014 | Packard et al. | |
| 2014/0115451 A1 | 4/2014 | Sheldon-Dante | |
| 2014/0115464 A1* | 4/2014 | Shih | G06Q 10/109 715/716 |
| 2014/0214846 A1 | 7/2014 | Robert et al. | |
| 2015/0375117 A1 | 12/2015 | Thompson et al. | |
| 2016/0105733 A1 | 4/2016 | Packard et al. | |

\* cited by examiner

SYSTEM AND METHOD FOR REAL-TIME GENERATION OF SEGMENTS FOR A COMPUTERIZED DECISION SYSTEM

CROSS REFERENCE TO RELATED APPLICATIONS

This application claims benefit of the filing date of U.S. Provisional Application No. 62/402,912, filed Sep. 30, 2016, the entire disclosure of which is incorporated herein by reference.

BACKGROUND

Computerized systems for generating data segments for use in decision systems are known. These systems, however, lack the ability to generate data segments in real time that reflect accurate information about a user's condition, including a combination of user-disclosed data, user-inferred data, and user situation/activity data. Prior systems use techniques such as internet-based cookie-level user attributes, manual content-based targeting, and manual event targeting to make decisions that may be used to generate recommendations, target messages, or take other actions customized to users Audience targeting using cookie-level audience attributes from first party or third party sources has been used to target messages to an individual online. Content targeting, such as directing messages to consumers of certain types of content (e.g., football games) has been done manually by choosing to schedule advertisements or display other messages during such programming. Manual event targeting has been performed by predetermining a one-off event like a win of a given game and manually allocating creative options based on the outcome once the outcome is known.

Targeting in a television environment is generally limited to digital solutions and non-1:1 environments. Current systems are not capable of such automated, real-time targeting or customization at scale, requiring manual changes at a production switchboard.

Prior art systems are not designed to address the specific user conditions such as an inferred emotional state of a user, enabling 1:1 targeting to that user; they are only capable of mass targeting using rules-based decisions determined across sets of qualifying users.

DETAILED DESCRIPTION

As set forth in more detail below, the present disclosure is directed to methods and systems for real-time generation of segments to be used in a decision system. As used in this disclosure, "real-time" means that the system is able to generate segments in response to real-world events occurring, within 1 to 2 minutes of the event occurring. This real-time capability is partially enabled by a near instantaneous (under 500 ms) delivery of a segment list file to a decision engine, measured from the time the system receives a trigger initiating its process. By predetermining data and logic rules prior to operation, and using efficient logic and processes (as described herein), in some embodiments, this near instantaneous process is completed in under 200 ms.

The system provides real-time generation of data segments ("segments") related to recent or current events (i.e., occurring within a defined time window), based on a user's declared characteristics, inferred characteristics about the user, and characteristics of the events themselves. The generated segments may be delivered to any number of decision systems for making real-time decisions based on the events.

The delivered segments may be used, for example, by a decision-making system to select and deliver instructions to render content relevant an individual, to select previews of the next content or videos that might be suggested to the individual, or recommend the individual sign up for another product or service. Alternatively, the decision making system may select a message to send to an individual suggesting an action for the individual to take (such as, for example, to offer or provide a particular service to a customer), a recommendation to a customer of an item to purchase (or to avoid purchasing), a recommendation to a potential viewer or a listener of a live video or audio program to tune into the program, or the selection of an advertisement or other message to display or play for a viewer or listener.

The description of the Segment Delivery System of the current disclosure includes a description of the logical operation of the system, which may be implemented through hardware, firmware, software, programmable logic, or any combination of the foregoing that is capable of implementing the operation so described. Whether used in a computerized system that makes decisions related to recommendations or actions or advertising or other functions, the Segment Delivery System of the present disclosure improves the operation of such computerized systems to expand the quality and types of decisions that can be made in real time, in a manner not possible under the prior art.

Figure 1:
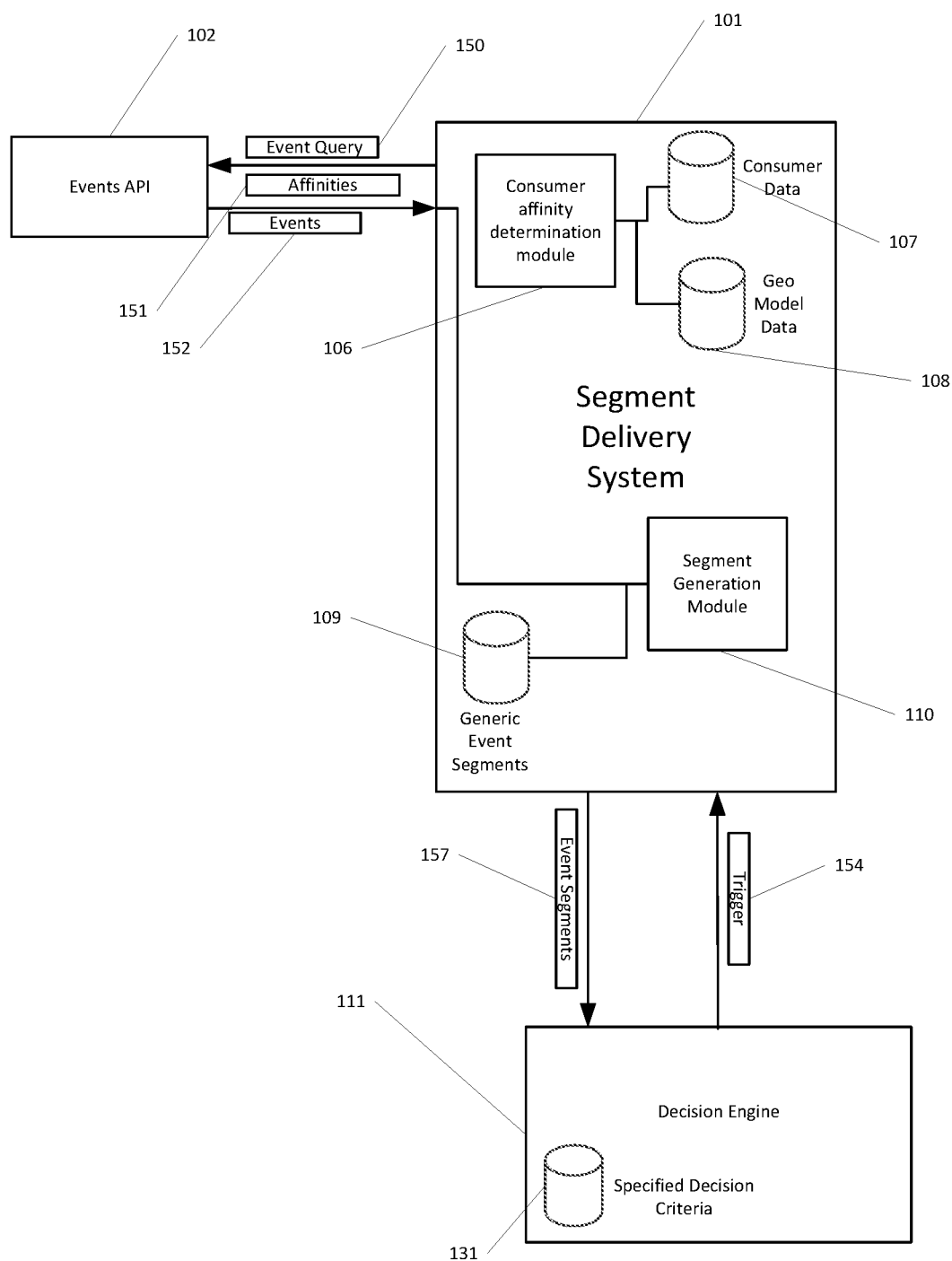
FIG. 1 is a system block diagram of the components of a system, in accordance with embodiments of the present disclosure.

FIG. 1 shows a block diagram of a computerized system according to an embodiment of the present disclosure. The computerized system includes a decision engine 111, a module for making a decision, as is known in the art. The Segment Delivery System of the present disclosure improves operation of the computerized system by enabling the decision engine to make a more accurate, targeted, customized decision in real time, compared to prior art systems. The Decision Engine 111 may be, for example, a decision engine to generate recommendations, target messages, or take other actions customized to individual consumers. Examples may include a content recommendation decision engine that recommends content for consumers to view, listen to, read, or otherwise consume. The Decision Engine 111 may be a product recommendation engine to recommend a product to a consumer. The Decision Engine 111 may be a message targeting decision engine, such as an advertisement selection engine.

The Decision Engine 111 includes decision criteria 131 that may be specified according to the specific needs or interests of a particular user of the system. For example, a user of a content recommendation decision engine may specify criteria for selecting the optimal content recommendation for a consumer according the needs of the user. A user of an advertising decision engine may specify decision criteria for selecting advertising campaigns and advertisements according to the specific consumers, consumer characteristics, and situations the advertiser wants to target, allowing them to prioritize high-worth scenarios before others, in the case that some targets could be co-occurring.

When the Decision Engine 111 determines that a decision needs to be made, it sends a trigger 154 to a Segment Delivery System ("SDS") 101 of the present disclosure. The SDS 101 is a portion of the computerized decision system and includes a repository of consumer data 107, a repository of geographic ("geo") data 108, and a repository of generic event segments 109. The consumer data 107 may include data relating to the consumer, such as self-declared affinity data that is input by the consumer, for example when creating or modifying a user account. The user may state affinities or preferences for certain types of content, sports teams, products, occupations, etc. The consumer data 107 may also include consumption data that reflects consumption behavior of the user. This may include, for example, past purchases by the user, or content viewed, read, watched, or listened to by the user. The consumer data 107 may also include data about content currently being consumed by the user. For example, if the user is viewing a video or reading an article, the Consumer Data 107 may include information about the video or article such as the type of content, the subject matter, the entities or personalities (e.g., sports teams, celebrities) involved. In addition, it could contain other information or attributes related to the consumer relevant to informing a customized decision. For example, consumer behavioral, demographic or psychographic attributes, or past behaviors or actions. This may provide information about the consumer's current context and may be referred to as Content Segment data or Context Segment data. Geo model data 108 may include data related to characteristics and locations of other consumers. For example, geo model data may include population characteristics such as percentage of people in a given zip code that enjoy a particular sport or use a particular consumer brand or good or who are fans of a particular sports team. The zip code data may be linked to ranges of internet IP addresses to reflect that the consumer is accessing the internet from within the geographic area covered by the particular zip code, as is known in the art.

A repository of predetermined generic event segments 109 may include generic event data segments that include information that may identify and describe types of events, characteristics of those types, and duration of the event or of some aspect of the impact of the event. For example, a generic event segment may include a type of event, such as "team just won a game in overtime," an emotional state associated with the type of event, such as "joy/relief/excitement," and an expected duration for that emotion, for example, 2 days. Other examples of generic event segments may include: news-related events such as "local weather event leads to fatalities," with an emotional state such as "sadness," and an expected emotion duration of 1 week; "flight delayed" with a field for a duration of the flight delay; "book released" with an expected duration that the book may be considered "new" for 1 month; or "storm predicted" with an expected duration that the predicted storm may impact purchase decisions for 48 hours. The predicted impacts of the generic events may be determined by experimental data regarding real or simulated events using surveys, lab tests, or other research techniques.

The SDS 101 also includes a Consumer Affinity Determination Module 106, which includes logic that interfaces with the Consumer Data repository 107 and the Geo Model Data repository 108 to generate consumer affinities for use by the SDS 101. Consumer affinities may include products or content that a consumer enjoys or has previously purchased or consumed. Other types of Consumer Affinities may include sports teams, players, or other competition contestants that the consumer is a fan of. It may also include genres of books, movies, television, radio, podcast, or other content or characters within the content that the consumer is a fan of, or geographic areas the consumer has an affiliation with. The operation of the Consumer Affinity Determination Module 106 will be described below in reference to one of the flow diagrams.

An Events Application Programming Interface ("API") 102 of a type known in the art provides events in response to an Event Query 150 that was initiated based on Consumer Affinities 151 received from the SDS 101. An Event Query 150 may be a message including a request for one or more Events 152 to be returned, along with a time window within which the desired Events 152 should have occurred. The Events API, which may be connected to one of several types of data sources, will return one or more Events 152 based on the specified time window and the Consumer Affinities 151. For example, the Consumer Affinity Determination Module 106 may determine that a consumer has relatives residing in 7 zip codes distant from the consumer's location, so these 7 zip codes may constitute Affinities 151 that are sent to an Events API that is connected to a weather forecast and alert data source, along with an Event Query 150 that requests Events 151 in the form of severe weather alerts in a time window that have occurred in the past 24 hours or are forecast for the next 48 hours, and that cover the 7 zip codes (affinities) where the consumer has relatives. In another example, the Events API 102 is a Sports Event API and is connected to a stream of sporting event-related data. This may include data obtained through direct connection to electronic scoreboards or other auto-generated data sources, or data entered manually by individuals or groups tracking games or other contests in process, as well as data sources such as data available from entities such as organizations that track odds occurrences such as upsets or point spreads for purposes of calculating wagering information. In this example, the consumer Affinities 151 may be sports teams or players that the consumer is a fan of, and the Event Query 150 may include a time window that is sufficient to cover "pre-game," "live," and "post-game" states of play. The Events API 102 may return all Events 152 for teams the Consumer Affinities indicate the consumer is a fan of within the relevant time window. Examples of these events may include, for example: baseball team X, 5 runs, baseball team Y, 7 runs, end of $11^{th}$ inning, game over—where baseball team X is estimated by the Consumer Affinity Determination Module 106 to be the consumer's favorite baseball team; odds makers are favoring football team X over football team Y by 5 points for the next day's game—where the Consumer Affinity Determination Module 106 has estimated football team X to be the consumer's favorite football team; and player Z from basketball team X—which is estimated by the Consumer Affinity Determination Module 106 to be the consumer's favorite basketball team, has announced his retirement from the sport.

Events 152 generated by the Events API may be processed by predetermined rules set up in Generic Event Segments 109 and sent to a Segment Generation Module 110. The detailed operation of the Segment Generation Module 110 will be described below in reference to one of the flow diagrams. The Segment Generation Module 110 associates each Event 151 from the Events API 102 with a generic event from the Generic Event Segment data 109. For example, an event such as "baseball team X, 5 runs, baseball team Y, 7 runs, end of 11$^{th}$ inning, game over" may be associated with a generic segment such as "team loses, extra innings, close game." Alternatively, the generic segment associated with the event may contain additional information, such as an estimated length of impact of the event on the consumer, a predicted emotion of the consumer, a predicted action the consumer may take, etc. For example, the generic segment for the above baseball example may include information such as "team loses, extra innings, close game, sadness, 1 day." In another example, the response returned in Events 152 may indicate "tornado expected at 10 pm in the area", which could be associated with a generic event to "storm in less than 3 hours for current time zone" in Generic Event Segments 109

An Event Segment List is generated from the associated Events and Generic Event Segments and sent to a Decision Engine 111, which includes Specified Decision Criteria 131. The Decision Engine 111 may be, for example, logic residing on a server that compares data such as the Specified Decision Criteria 131 to the Event Segment List to make a decision about an action to be taken. For example, where the Decision Engine 111 is a recommendation engine, it compares the Event Segment List 157 to Specified Decision Criteria 131 concerning potential recommendations and if there is a sufficient match, the Decision Engine 111 generates a recommendation for the consumer. In another example, the Decision Engine 111 may be an advertisement selection module that selects an advertisement to display to the consumer based on the Event Segment List 157 and the Specified Decision Criteria 131.

Figure 2:
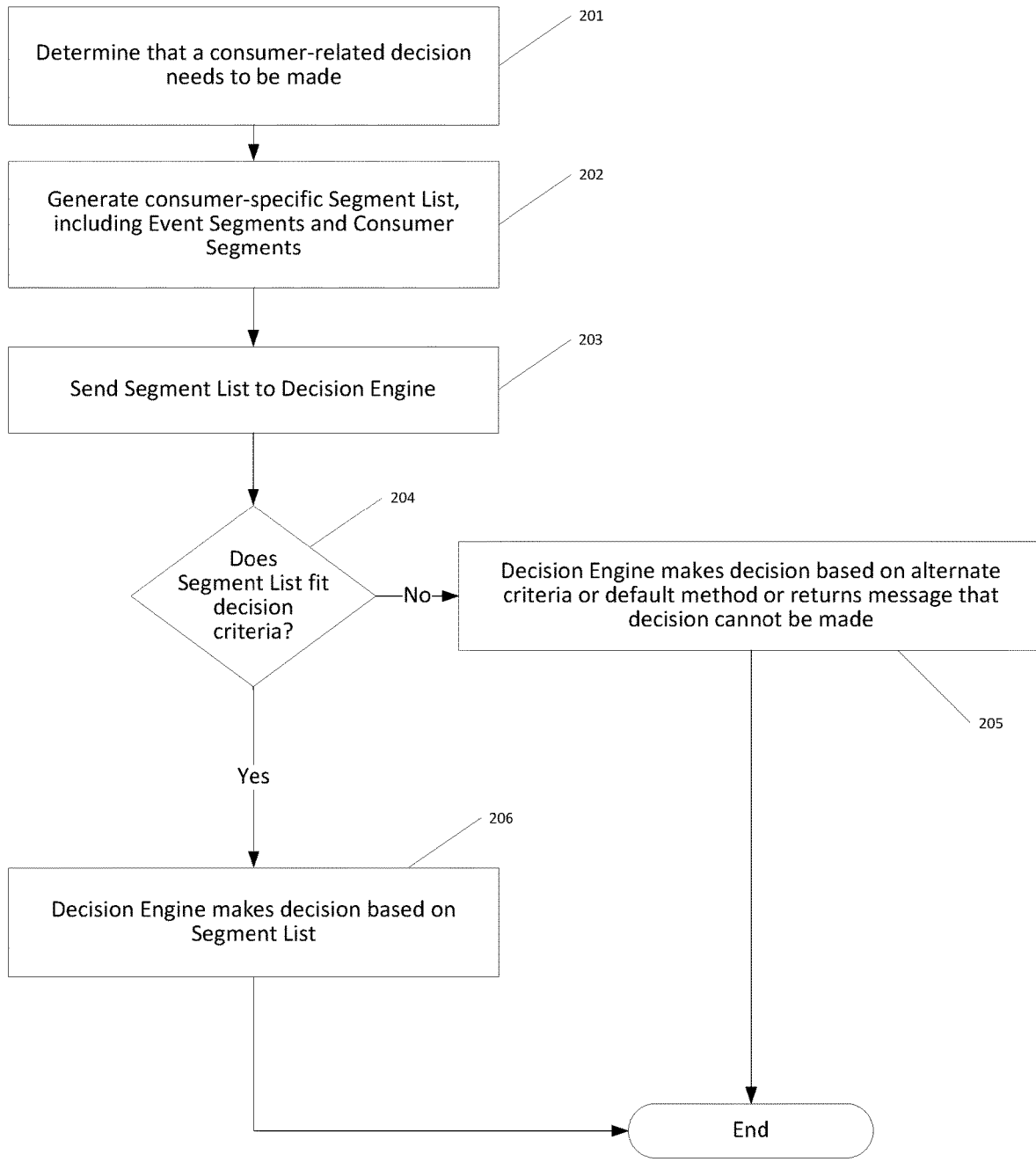
FIG. 2 is a flow diagram of a method, in accordance with embodiments of the present disclosure.

FIG. 2 shows a flow chart of a method for improving the operation of a computer system including a decision engine, according to an embodiment of the present disclosure. At 201, it is determined (for example, by a decision engine) that a consumer-related decision needs to be made. At 202, a consumer-specific Segment List is generated. The Segment List may include Event Segments and Consumer Segments, which may be used by the decision engine in making the decision. At 203, the Segment List is sent to the decision engine. At 204, the decision engine evaluates whether there is significant enough correspondence between Segment List and the decision criteria for the decision engine to render a decision based on the Segment List. If there is not, the method proceeds to 205 and the decision engine makes a decision based on alternate criteria (or, alternatively, makes no decision and returns a message stating that no decision can be made). If it is decided in 204 that the Segment List is sufficient for a decision to be made, then in 206, the decision engine makes the decision based on the Segment List and the predetermined decision criteria, using decision logic known in the art.

Figure 3:
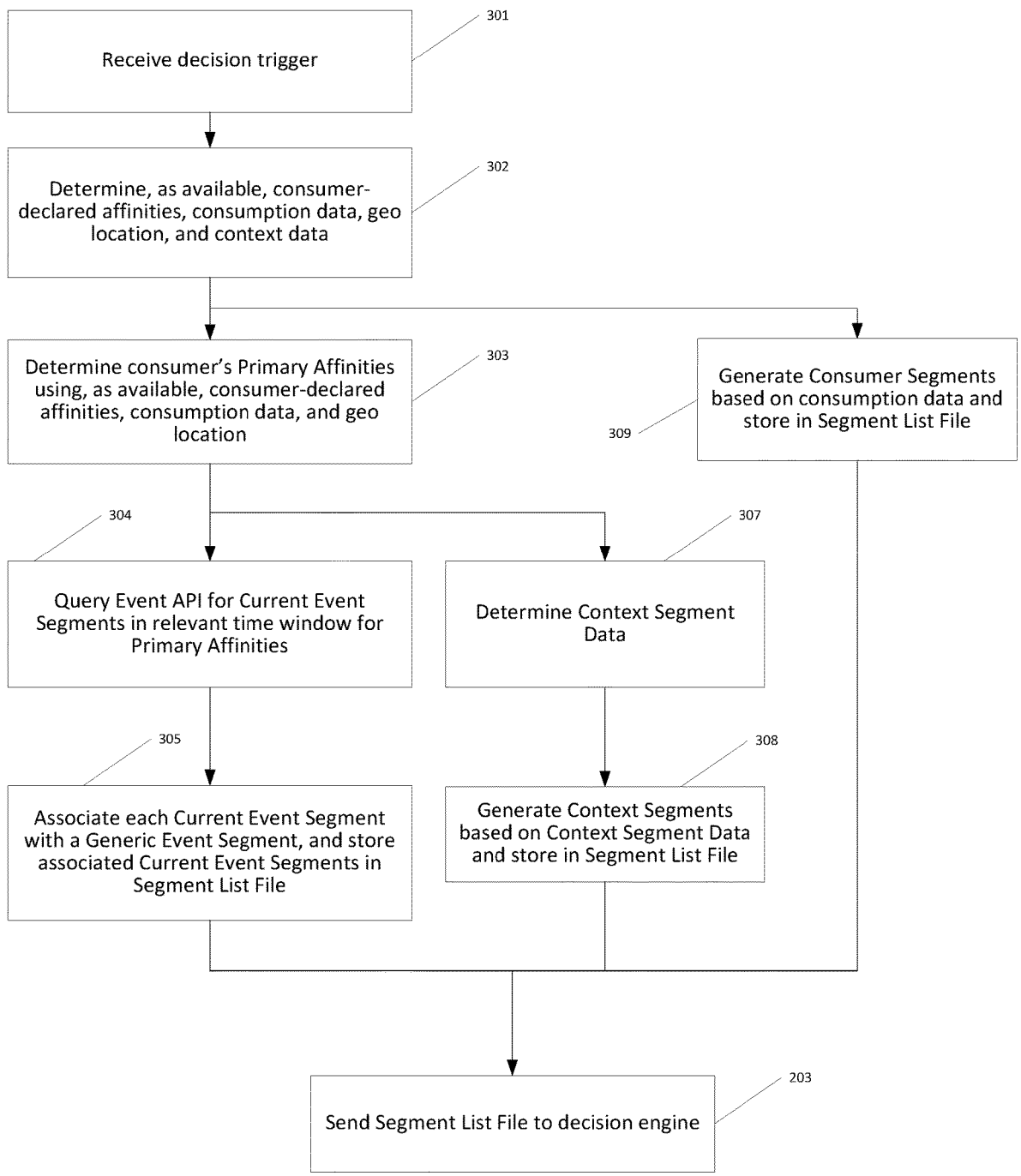
FIG. 3 is a flow diagram of a method, in accordance with embodiments of the present disclosure.

FIG. 3 shows a detailed process for generating a consumer-specific Segment List, including Event Segments and Consumer Segments as shown at 202 in FIG. 2. The process begins with receiving a decision trigger 301 indicating that a decision needs to be made and triggering the segment list generation process. The method shown in FIG. 3 may be performed, for example, by the SDS 101 in combination with an Events API 102, as described with respect to FIG. 1.

In 302, it is determined whether consumer-declared affinities, consumption data, geo location data, and context data are known. Consumer-declared affinities may be determined through information provided by the consumer when setting up a user account. Alternatively, this information may be obtained through other customer accounts such as social media accounts to which access has been provided. Alternatively the information may be determined by survey results, online questionnaires, or other mechanisms by which a consumer may report affinities. Consumption data may be determined, for example, by reviewing a log of the consumer's content consumption over a period of time, including scale, recency, and frequency data. This may be done via tracking a consumer who is logged into an account through internet browser software ("cookies") or other known tracking methods. If the consumer does not have a relevant account, or is not logged into an account, that consumer may be tracked anonymously via known internet tracking methods, such as cookies or using the device ID provided by the manufacturer for advertising purposes.

Consumption data may be similarly tracked through a logged in user account or an anonymous user advertising ID that tracks the scale, recency, and frequency of the consumer's consumption of content such as online articles, videos, audio files or streams, and in some embodiments, social media posts. Data on these factors are gathered using known techniques and then used to generate a recency-frequency ("RF") score according to a new formula. Geo location data about the consumer may be gathered/inferred from the geographic location (e.g., zip code) from which the consumer is accessing the internet, as indicated by the consumer's IP address. This geo location data may be compared against other databases to make inferences about the consumer's characteristics and affinities, by assigning an index value to that zip code (based on the gathered/inferred data within that zip code), and then assign the user to the appropriate zip code with that index score, as described above.

Figure 4:
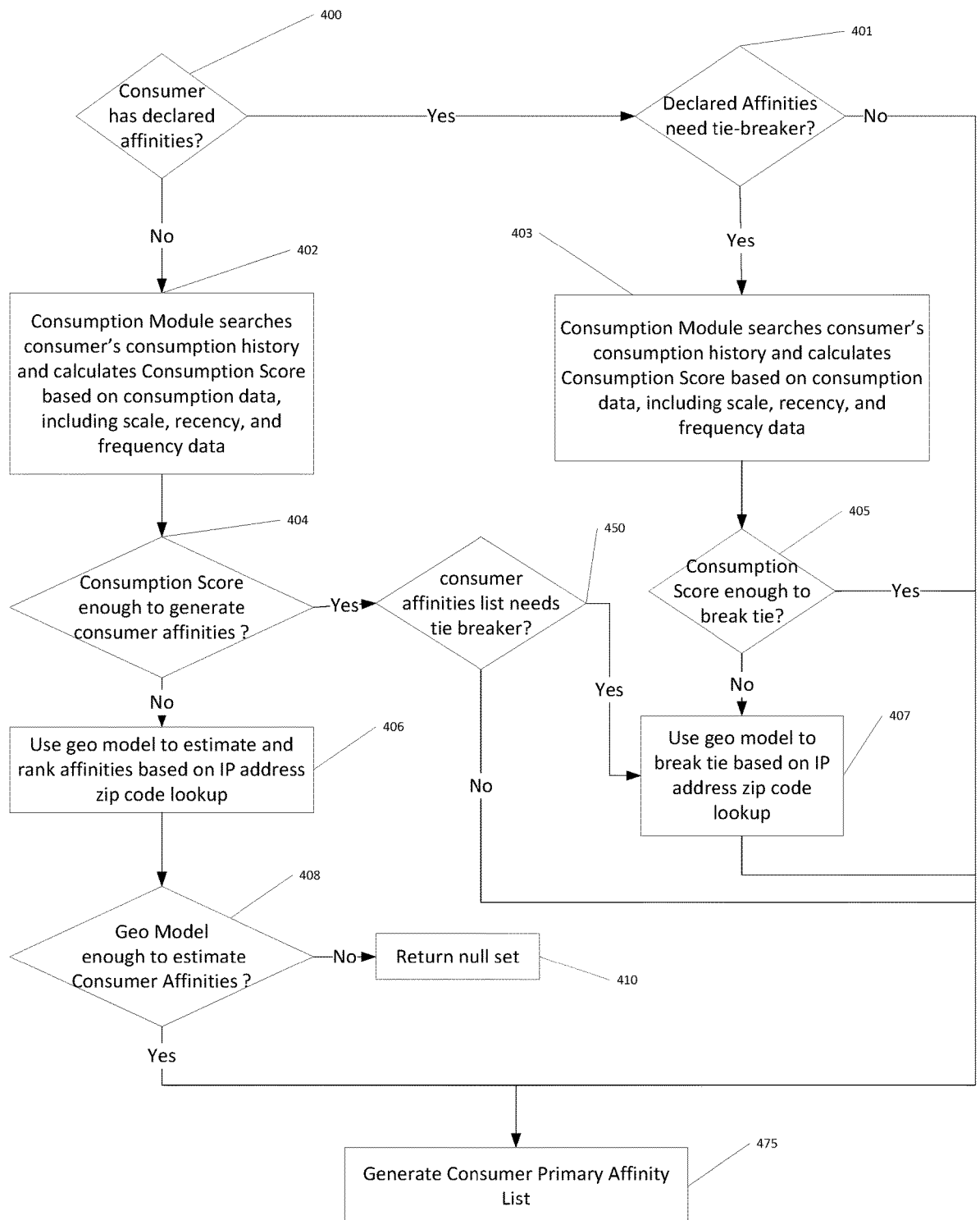
FIG. 4 is a flow diagram of a method, in accordance with embodiments of the present disclosure.

In 303, the consumer's Primary Affinities are determined using consumer-declared affinities, and consumer derived data including models from consumption data, and geo location data, in a method shown in more detail in FIG. 4. In 309, which may optionally be performed concurrently with 303, Consumer Segments are generated based on consumption data and stored in the Segment List File. The Consumer Segments may be, for example, one or more "RF" scores based on the consumer's consumption patterns, which may include content consumption patterns. The RF score may be used, for example, to help determine which among several categories of affinities a consumer is most interested in or impacted by. For example, where each Primary Affinity for the consumer is a sports team, the RF score may indicate which sport the consumer is most interested in, second most interested in, etc. One example of how an RF score may be calculated is according to the formula below:

$$RF\ Score = R1*F1 + R2*F2 + R3*F3 + R4*F4 + R48*F48$$

where R1 is the Recency weight in time period 1, R2 is the Recency weight in time period 2, etc. and F1 is the frequency of visits in time period 1, F2 the frequency of visits in time period 2, etc. In one embodiment, time period 1 is week 1 (e.g., of a season or a relevant multi-week time period), time period 2 is week 2, etc., In this example, R48 and F48 are the recency and frequency weights for the last 48 hours. In the present example, in the Fourth week of the season, the weight of R1 is 0.25, R2=0.5, R3 is 0.75, R4 is 1, and R48 is 2.

In 304, a relevant time window is determined for events to be returned from an Events API. The relevant time window may vary according to application, but determination of the time window may account for pre, live, and post event states. Also in 304, the SDS sends a query to the Event API for Events based on the consumer's Primary Affinities and the time window. In 307, which may be performed approximately concurrently with 304, Context Segment Data is determined. Context Segment Data may include, for example, information about the content the consumer is currently consuming at the time the process is being run. This may include a video the consumer is watching, an article the consumer is reading, or a song or spoken word broadcast the user is listening to. In one example, a video ID or other content ID is sent to the Events API to determine the current status of the event the content being consumed is covering. For example, the Events API may return the information that the sports game that is the subject of a video being broadcast has 1 minute 11 seconds left before it goes to halftime and the unfavored team is ahead of the favorite by 2 points. In 308, Context Segments are generated based on the Context Segment Data and added to the Segment List File. In an example of a live game being viewed by the consumer, Content Segments would be created to identify the timing left in the game, the score differential, underdog status of the leading team, and the anxiety emotion created by the score window, in addition to a more generic Content Segment that would identify the consumer's current consumed medium as "video."

In 305, each Current Event Segment returned by the Event API in 304 is associated with a Generic Event Segment that was predetermined and stored as described above. After 305 and 308 are both complete, the process moves to 203, which is the same step shown in FIG. 2 where the Segment List File that resulted from steps 309, 308, and 305 is sent to the decision engine.

While the blocks 303,309 and 304,307 in FIG. 3 have been respectively shown as being performed approximately concurrently, either or both of these respective paths may be performed in series or sequentially in time, if desired, provided the parameters calculated by a given block (or calculation) are available when they are needed by a future block (or calculation).

FIG. 4 illustrates a process that generates a Consumer Affinity List according to an embodiment of the disclosure. At 400, it is determined whether the consumer has declared affinities. This may be done, for example, by determining whether the consumer has a user account that allows the user to self-declare such information and whether the consumer is logged in to that account. It may also involve searching for alternate user accounts with third parties such as social media providers, customized alert or news feeds, reviewing social media profiles, or other internet or data sources where users may declare affinities. If the consumer has declared affinities the system can access, the method proceeds to 401 where it is determined whether the declared affinities need a tie-breaker. For example, in some embodiments, if there is more than one stated affinity for each category, a Primary Affinity for each category must be determined. In other embodiments, the affinities may be ranked within each category.

If the declared affinities do not need a tie breaker (i.e., there is only one declared affinity per category), the method proceeds to 475, where the final Consumer Affinity List is generated, which in this case would constitute the declared affinities. If a tie-breaker is required, in 403 a Consumption Module searches the consumer's consumption history and calculates a Consumption Score based on consumption data such as scale, recency, and frequency data. The Consumption Module may be, for example, software or logic that resides within the consumer affinity determination module 106. An example of a consumption score that may be calculated by the Consumption Module is the RF score described above with respect to FIG. 3. Other Consumption Score calculations may be performed based on prior purchases or subscriptions or cadence of interaction by the consumer with content or data related to the application. In another embodiment this could include location data of the consumer in the real world that has been associated with the consumer's profile, enabling the recency and frequency identification of the consumer's activities in the real world.

In 405, it is determined whether there is enough data for the Consumption Score to break the tie. For example, if the Consumption Score for one category is based on sufficient data, the score may be used to break a tie in that category, but if there is not sufficient data in the consumption score to break a tie in another category, then a different method must be used for that category. For example, in a sports context, the Consumption Score may be an RF Content Consumption Score based on the consumer's recent consumption of content. During baseball season, this score may provide sufficient data to break a tie between two baseball teams the consumer has declared affinities for, but may not be enough to break a tie between two declared hockey teams, as the consumer may not consume sufficient out of season content to provide enough data to break a hockey tie. Therefore, in 405, a predetermined threshold for the Consumption Score is applied to determine if the score is calculated from sufficient data to provide a meaningful tie breaker calculation. Furthermore, the Consumption Scores for candidate affinities may be compared to each other and, if found to be sufficiently close (based on a predetermined threshold), they may not provide an accurate tie breaker.

If the Consumption Score is not enough to break the tie, a geo model is applied to break the tie in step 407. As described above, the geo model uses the consumer's location to determine likely affinities for the consumer. For example, if more people in the consumer's zip code purchase product A than product B by a significant margin, then the consumer is assumed to have a greater affinity for product A. Similarly, if significantly more fans of baseball team X reside in the consumer's zip code than baseball team Y (both declared affinities by the consumer), then the geo model will break the tie and assign the consumer a Primary Affinity for team X. Once the tie is broken in either 405 or 407, the method proceeds to 475 where the final Consumer Primary Affinity List is generated.

Returning to 400, in the case where there are no declared affinities available to the SDS, the process proceeds to 402 where, similar to 403, the Consumption Module searches the consumer's consumption history and calculates a Consumption Score based on consumption data such as scale, recency, and frequency data. In 404, it is determined whether the Consumption Score is sufficient to generate consumer affinities. For example, there may be sufficient data to generate a Primary Affinity for one category (e.g., favorite coffee brand) but not another category (e.g., favorite tea flavor). If there is sufficient data to generate at least one affinity for a category, the process proceeds to 450 where, similar to the process in 401, it is determined whether the determined consumer affinities in each category need any tie breaker. If yes, the method proceeds to 407 and the geo model is used to break the tie, as described above, and the method proceeds as described. If no tie breaker is needed, the process proceeds to 475, as described above.

If, in 404, it is determined that the Consumption Score is not sufficient to generate consumer affinities, then in 406, the geo model attempts to generate consumer affinities, as described above. In this case the consumer is assumed to have the most popular affinities for other consumers in the consumer's geographic area. In 408, it is determined whether the geo model had enough data for the affinities being sought to estimate the consumer's affinities. If not, a null set or error message or the like is returned in 410. If there is sufficient data, the geo model returns a collection of top consumer affinities, which is formulated into the final Consumer Primary Affinity List in 475. This final Consumer Primary Affinity List is then used for the event query as described above.

Figure 5:
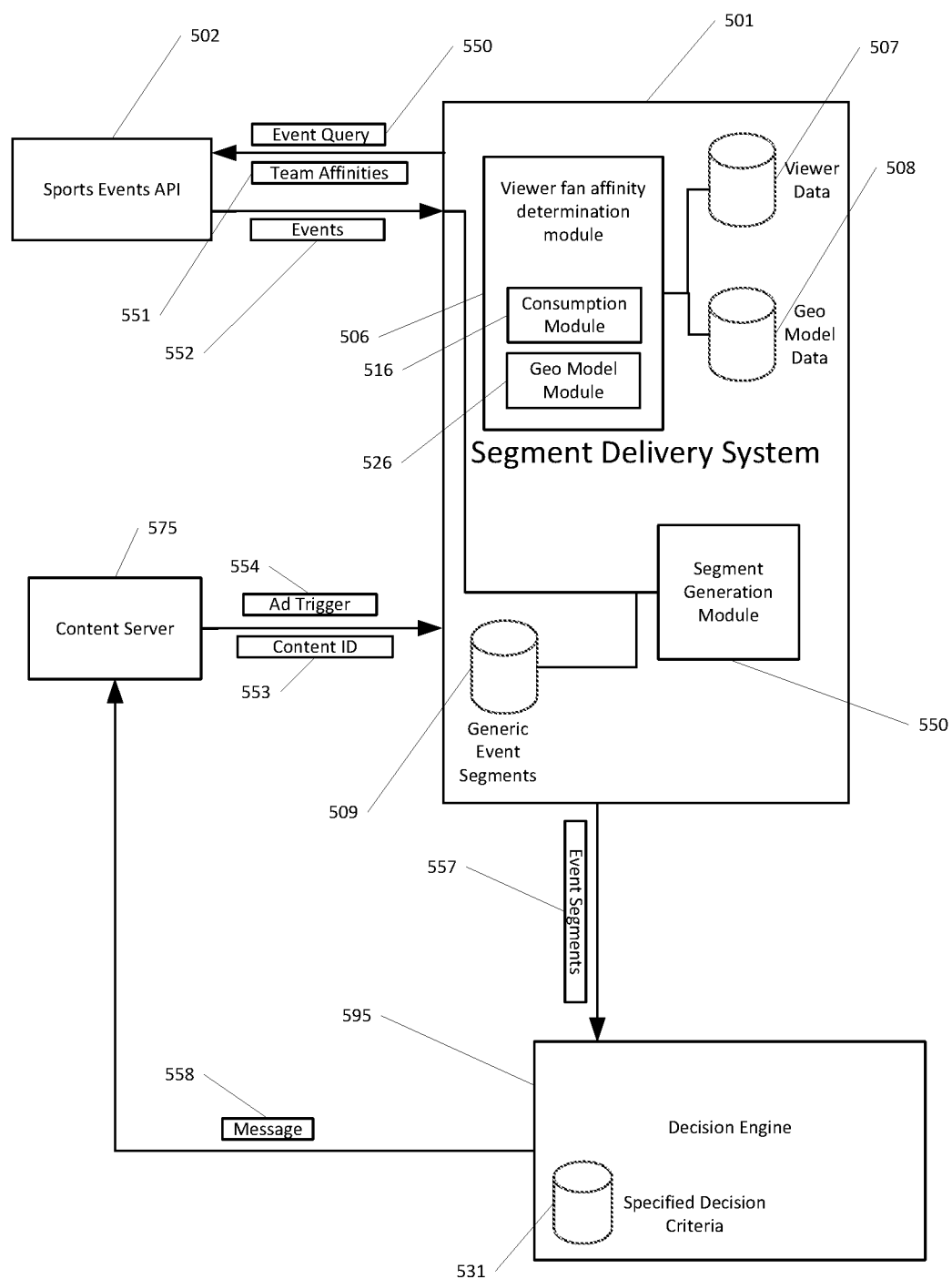
FIG. 5 is a system block diagram of the components of a system, in accordance with an embodiment of the present disclosure.

FIG. 5 shows another embodiment of the present disclosure that is adapted to operate in an advertising context for a sports consumption environment. In the embodiment shown in FIG. 5, the decision module that is an advertisement selection module. The consumer whose information is being used to influence the decision is, in this context, a consumer of sports-related content such as a viewer of a sports game, news program, highlight video, a listener of sports-related audio programming, or a reader of sports-related digital content. Although this embodiment is discussed in particular reference to sports-related content, it is to be understood that this is just an example, and this embodiment of the disclosure may be equally applied to other categories of content, such as news, education, or entertainment. Likewise, although as an illustrative example, the decision engine in the context of the embodiment shown in FIG. 5 is adapted to make decisions related to advertisement selection, it is to be understood that other applicable examples of decision engines are within the scope of this embodiment of the disclosure. Non-limiting examples include: programming or other content recommendation decision modules, consumer product recommendation decision modules, suggested or directive action decision modules, etc.

The system shown in FIG. 5 improves the operation of decision engine 595 by enabling it to make real-time message selection decisions to select a message for a particular consumer, based on affinity information about that consumer and real-time events the consumer is experiencing. This allows the system to make decisions based on inferred characteristics of the consumer based on affinities and events, such as an inferred emotional state of the consumer, a likelihood that the consumer is highly engaged or paying attention, etc. The message selected by the decision engine may be an advertising campaign, an advertisement, an alert or recommendation, another type of message, or a combination of any of these.

In this version of the disclosure, the Segment Delivery System ("SDS") 501 is in communication with a Content Server 575. The Content Server 575 may be, for example, a web site server, an internet-based video player, a television or radio broadcasting system or other system for serving content to a consumer (who may also be termed a "viewer" or a "listener" of the content). When the Content Server 575 determines that it is time for a decision to be made by the Decision Engine 595 (for example, an ad break in a video program, new content is being loaded from a website, or it is otherwise time to send a recommendation, alert, or other message to the consumer), the Content Server 575 sends a trigger to the SDS to initiate the process of generating Event Segments 557 to send to the Decision Engine 595. The Content Server 575 also may send a Content ID 553 to the SDS to identify the content that the viewer is viewing in order to determine the viewer's context when the decision needs to be made.

In the embodiment shown in FIG. 5, the Consumer Affinity Determination Module is a Viewer Fan Affinity Module 506. The Viewer Fan Affinity Module 506 includes a Consumption Module 516 and a Geo Model Module 526. Viewer data 507 may include predetermined data such as the viewer's account, account status, declared affinities, and content consumption history (including scale, recency, and frequency data for videos watched, articles read, audio content listened to, etc. with reference to sports teams or other affinity-related subject matter of the content). Geo Model Data 508 includes predetermined geography-based affinity data for groups of consumers in various geographic areas. This may include, for example, a zip code-based lookup table including the propensity to be a fan of various teams indexed by zip code or other geographic designation. The Geo Model Module 526 will determine the viewer's IP address based on the Content Server's trigger 554 and use that to determine the viewer's general geographic location using known techniques. The Geo Model Module 526 will then access the Geo Model Data 508 to determine the fan affinities associated with general consumers in the same geographic area as the viewer.

The Viewer Fan Affinity Determination Module 506 accesses the Viewer Data 507 in order to determine the viewer's account information and declared affinities. Within the Viewer Fan Affinity Determination Module 506, Consumption Module 516 also obtains data from the Viewer Data 507, including the viewer's consumption data in order to calculate the viewer's Consumption Score (e.g., an RF score) as described above.

The method of operation of the Viewer Fan Affinity Determination Module 506 is described above with reference mainly to FIG. 3. In a sports content environment, the consumer affinities are teams or athletes of which the viewer is a fan, and primary affinities are the primary team for each sport of which the viewer is a fan (or individual athlete for individual-based sports), and as stated above, the Geo Model Data is data indicating which teams are most popular for each sport, broken down by relevant geographic area.

The SDS 501 sends an Event Query 550 and the Primary Team Affinities 551 to the Sports Events API 502 to query for events related to each Primary Affinity Team (it is to be understood that references to "Team" in this disclosure may refer to individual athletes for individual-athlete sports). The event query 550 may include, for example, a request for events in a pre-, live, and post-status. Live events are events that are related to games or contests that are currently in process at the time of the event query. Pre- and post-events occur prior to or are scheduled to occur after the current time at the time the event query is made. A predetermined time window may be defined for each sport or team that will determine the "look-back" and "look-forward" for events returned from the Sports Events API 502. For example, during a sport's regular season, the time window for pre-events may be limited to a few days, and events related to the viewer's primary affinity team in that sport will not be returned if they are older than that timeframe. On the other hand, during a pre-season period when there is not as much activity in the sport, the pre-time window may be defined as a few weeks.

Generic Event Segment data 509 includes predetermined generic event segments relating to the types of event categories that may occur and be returned by the Sports Events API 502. Examples of generic event segments include event descriptors such as "Team wins game in final seconds of overtime" "Team wins Tournament game" "Team wins Tournament Championship" and "Team upsets top-10 opponent." In this example, all of these generic event segments could potentially apply to a single Event 552 under the right circumstances. Generic event segments may also include data about the inferred impact of a generic event. For example, predetermined emotion data about the emotional impact of an event may be stored with the generic event descriptor, as well as the predicted expiration time for this emotional impact. This emotion-related data may be determined experimentally through viewer surveys or lab experiments where viewers are shown various game situations where they either have a preconceived team affinity or are assigned a team affinity (e.g., by receiving a reward or penalty based on the game outcome).

The Segment Generation Module 550 uses predetermined logical rules (which may be stored with the Generic Event Segments 509, or elsewhere) to process the Events 552 returned from the Sports Events API 502 and associate them with the predetermined generic event segments. For example, for a returned event such as "Basketball, Tournament Final, Team X 75, Team Y 65", the Segment Generation Module 550 may parse the event and determine that the event relates to basketball and then apply the basketball segment rules to the event. These rules may include subtracting the low score from the high score to determine whether any logical rule relating to the score applies, such as whether an in-process game is tied or close enough to be considered a tie, or if a final score was a major upset or a blowout or a close game, etc. Once all applicable rules have been applied to or tested against an Event 552, the event is associated with all applicable generic event segments, as indicated by the logical rules. The SDS may test information included with the generic event segment before adding the associated event to the segment list file. For example, if a predicted expiration time related to the event has expired (e.g., a predicted emotional impact is no longer applicable) the event may not be added to the segment list file.

Alternatively, the event segment may be added to the segment list file, and the predicted expiration time may be tested and analyzed by the Decision Engine 595 under the Decision Criteria 531, including determining if the predicted expiration of the impact of the event has passed. In the case where the Decision Engine 595 performs advertisement selection, the Decision Criteria 531 may be advertiser-specified criteria that specifies situations and emotions that the advertiser wants to target with an ad.

The Consumption Module 516 may also generate Viewer Segments based on the viewer's Consumption Scores to be incorporated into the Event Segment List 557. These Consumption Scores may be used by the Decision Engine 595 to determine which categories (e.g., sports) the viewer is most interested in so that the viewer's primary affinities may be ranked according to the viewer's level of interest, if that is desired criteria as part of the Specified Decision Criteria 531. Alternatively, the SDS may assign the viewer to certain categories of interest based on the Consumption Scores and deliver these assignments to the Decision Engine 595 as Viewer Segments incorporated into the Event Segment List 557. For example, if a viewer's Consumption Scores indicate the viewer regularly consumes content regarding one sport but only occasionally consumes content regarding another sport, the SDS may generate Viewer Segments indicating the viewer is a high-interest fan of the first sport and a medium-interest fan of the second sport. These segments may be used by the Decision Engine 595 to rank the events related to each of the viewer's primary affinities according to the level of interest the viewer has in the category related to that primary affinity.

The SDS may include logic to generate context segments based on the Content ID 553 received from the Content Server 575. For example, the Content Server 575 may also provide detailed information about the content being consumed, based on a query from the SDS that includes the Content ID 553. Alternatively, the SDS may be in communication with another data source that returns information about the content being consumed based on the Content ID 553. This information may be used by the SDS to generate Context Segments that describe the viewer's context in terms of the content the viewer is consuming. For example, the Context Segment may indicate that the viewer is currently watching a video of a football game that is currently tied with less than 5 minutes to go in the game.

By delivering an Event Segment List that includes not only Event Segments, but also Context Segments and Viewer Segments, the SDS enables the Decision Engine to make sophisticated real-time decisions related to the viewer. For example, if the Specified Decision Criteria 531 indicate that the operator of the Decision Engine wants to target only high-interest viewers who are currently viewing content related to their interest, where the content is at a particularly critical moment, and the viewer may be feeling anxious, then by applying these Specified Decision Criteria 531 to the Event Segment List, it may do so.

In one embodiment, the Decision Engine 595 may be a content selection engine that selects or generates content to be provided to a user's social media feed. For example, the Decision Engine 595 could formulate proposed messages for the user to post on social media based on events selected according to the user's determined affinities and user characteristics. Alternatively, the Decision Engine 595 could select content to be shown in the user's social media feed based on the Event Segment List 557, determining that the user is likely to be interested in such content.

In an embodiment of the disclosure where the SDS is targeted at sports applications, the Sports Events API may include a Fantasy Sports Events module. Alternatively, the SDS may be in communication with a separate Fantasy Sports Events API. In this case, in addition to Events 552 relating to sports teams for which the viewer has an affinity, Events 552 may include events relating to specific players on teams that the viewer is not particularly interested in, but who are affiliated with the viewer's fantasy sports team. In this case, the Viewer Data 507 includes data concerning the viewer's fantasy sports team roster. The Fantasy Events API may provide data concerning the status of the viewer's current fantasy sports contest, and either provide Events 552 related to the contest, or provide to the SDS a list of players on the viewer's fantasy team that may be used as affinities in an Event Query 550 to the Sports Events API. Events related to the status of the viewer's fantasy team and the performance of particular players may be processed by the Segment Generation Module and associated with fantasy-related Generic Event Segments 509, and these may be added to the Event Segment List 557 sent to the Decision Engine 595. In the case where the Decision Engine is a content recommendation engine, the Decision Engine may recommend, for example, that a viewer tune away from a less interesting game involving the viewer's favorite team to a game that may contain a critical performance for the viewer's fantasy team, even if the second game itself is not otherwise particularly interesting to the viewer. In another example, the Decision Engine 595 is an advertisement selection engine and the Specified Decision Criteria 531 may indicate that the advertiser wishes to target advertisements at viewers who may be experiencing a particular predicted emotional state due to a fantasy sports win or loss.

Portions of the present disclosure may be implemented or performed or executed or run in-parallel by separate computers or processors or processing centers, or clusters (e.g., multiple CPU cores operating in parallel), such as may be provided by Amazon® web services or the like.

Also, the system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices or systems described herein may include any number of computing devices capable of performing the functions described herein, including but not limited to: tablets, laptop computers, desktop computers, smart phones, cell phones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

At least the following is claimed:

1. A computer-based method for generating a real-time data segment list file for use by a computer-based decision engine to make a real-time decision based on real-time events and consumer-specific real-time data segments in the real-time data segment list file, comprising:
   receiving a data segment list file request from the decision engine;
   generating a list of consumer primary affinities based on at least one of consumer-declared affinities data, consumer consumption data, and consumer geolocation data;
   determining a relevant time window for relevant current events;
   generating a list of current event real-time data segments occurring during the relevant time window that relate to the consumer primary affinities, based on current event real-time data segments received from at least one event data source;
   retrieving a list of generic event data segments indicative of generic events, having a corresponding predetermined predicted real-time emotional state of the consumer and a corresponding predetermined emotion duration time, associated with each generic event
   dynamically associating by the computer each current event real-time data segment for each real-time event with at least one of the predetermined generic event data segments, the predetermined generic event data segments having at least the corresponding predicted real-time emotional state of the consumer and the corresponding emotion duration time;
   creating by the computer the real-time data segment list file using results of the associating, such that each real-time event has at least one generic event data segment having the corresponding predicted real-time emotional state of the consumer and the corresponding emotion duration time associated with the generic event;
   sending by the computer the real-time data segment list file, including at least the predicted real-time emotional state of the consumer and a corresponding emotion duration time, to the decision engine for use in making an accurate real-time decision regarding content to be delivered to the consumer, the response time from receiving the data segment list file request to sending the data segment list file being less than 500 milliseconds; and
   generating by the decision engine, in response to receiving the data segment list file, a recommendation of content to be consumed by the consumer or a selection of an advertisement to be shown to the consumer, the content recommendation or advertisement selection being based at least on the predicted real-time emotional state of the consumer and the corresponding emotion duration time.

2. The method of claim 1, wherein:
   the associating each current event segment with a predetermined generic event segment includes applying a set of predetermined rules to the current event segment.

3. The method of claim 1, wherein:
the decision engine is a content recommendation engine and the real-time decision regarding content to be delivered to the consumer is a recommendation of content to be consumed by the consumer.

4. The method of claim 3, wherein:
the content to be recommended is a broadcast of a sporting event.

5. The method of claim 1, wherein:
the decision engine is an advertisement selection engine and the real-time decision regarding content to be delivered to the consumer is a selection of an advertisement to be shown to the consumer based on the real-time data segment list file and specified advertiser decision criteria.

6. The method of claim 1, wherein the generating the consumer primary affinities list comprises:
determining whether consumer-declared affinities are available for the consumer, and if they are, generating a list of the consumer-declared affinities;
determining whether consumer consumption data related to the consumer's consumption is available and if it is, calculating at least one consumption score for the consumer based on the consumer consumption data;
if no consumer-declared affinities are available for the consumer, generating at least one estimated consumer affinity based on the at least one consumption score;
determining the consumer's geo location;
determining context data related to the consumer's context;
determining primary affinities from at least one of consumer declared affinities and estimated consumer affinities by applying the at least one consumption score to the at least one of consumer declared affinities and estimated consumer affinities to break any ties, and if ties remain, applying a geo location model to the affinities to generate the primary affinities list.

7. The method of claim 6, wherein:
the determining context data related to the consumer's context includes calculating a content consumption score based on content previously consumed by the consumer that is related to consumer affinities.

8. The method of claim 7, wherein:
the content consumption score includes a recency-frequency score based on recency and frequency data.

9. The method of claim 7, wherein:
the content consumption score includes a recency-frequency score based on recency, frequency, and scale data.

10. The method of claim 1, wherein the generating the consumer primary affinities list is performed before the receiving the request.

11. A computer-based method for generating a real-time data segment list file for use by a computerized decision engine to make a real-time decision based on current sports real-time events and sports-related consumer-specific real-time data segments, comprising:
receiving a sports-related data segment list file request from the decision engine;
generating a list of consumer primary team fan affinities based on at least one of consumer-declared fan affinities data, consumer sports content consumption data, and consumer geolocation data;
determining a relevant time window for relevant current sports events;
generating a list of current sports event real-time data segments occurring during the relevant time window that relate to the consumer primary team fan affinities, based on current sports event real-time data segments received from at least one sports event data source;
retrieving a list of generic sports event data segments indicative of generic sports events, having a corresponding predetermined predicted real-time emotional state of the consumer and a corresponding predetermined emotion duration time, associated with each generic sports event;
dynamically associating by the computer each current sports event real-time data segment for each real-time event with at least one of the predetermined generic sports event data segments, the predetermined generic sports event data segments having at least the corresponding predicted real-time emotional state of the consumer and the corresponding emotion duration time;
creating by the computer the real-time data segment list file using results of the associating, such that each real-time event has at least one generic event data segment having the corresponding predicted real-time emotional state of the consumer and the corresponding emotion duration time associated with the generic event;
sending by the computer the real-time data segment list file, including at least the predicted real-time emotional data of the consumer and a corresponding emotion duration time, to the decision engine for use in making an accurate real-time decision regarding content to be delivered to the consumer, the response time from receiving the data segment list file request to sending the data segment list file being less than 500 milliseconds; and
generating by the decision engine, in response to receiving the data segment list file, a recommendation of content to be consumed by the consumer or a selection of an advertisement to be shown to the consumer, the content recommendation or advertisement selection being based at least on the predicted real-time emotional state of the consumer and the corresponding emotion duration time.

12. The method of claim 11, wherein:
the generating the list of consumer primary team fan affinities includes generating a list of players on a fantasy sports team of the consumer;
the generating the list of current sports event segments that relate to the consumer primary team fan affinities includes generating at least one current sports event segment that relates to the performance of the consumer's fantasy sports team.

13. The method of claim 11, wherein the generating the consumer primary team fan affinities list comprises:
determining whether consumer-declared team fan affinities are available for the consumer, and if they are, generating a list of the consumer-declared team fan affinities;
determining whether consumer sports content consumption data related to the consumer's consumption of sports content is available and if it is, calculating at least one consumption score for the consumer based on the consumer sports content consumption data;
if no consumer-declared team fan affinities are available for the consumer, generating at least one estimated consumer team fan affinity based on the at least one consumption score;
determining the consumer's geo location;

determining content data related to sports content the consumer is consuming; and determining primary team fan affinities from at least one of consumer declared affinities and estimated consumer team fan affinities by applying the at least one consumption score to the at least one of consumer declared team fan affinities and estimated consumer team fan affinities to break any ties, and if ties remain, applying a geo location model to the team fan affinities to generate the primary team fan affinities list.

14. The method of claim 11, wherein the generating the consumer primary affinities list is performed before the receiving the request.

15. A computer-based method for generating a real-time data segment list file for use by a computer-based decision engine to make a real-time decision based on real-time events and consumer-specific real-time data segments in the real-time data segment list file, comprising:

receiving a data segment list file request from the decision engine;

generating a list of consumer primary affinities based on at least one of consumer-declared affinities data, consumer consumption data, and consumer geolocation data;

determining a relevant time window for relevant current events;

generating a list of current event real-time data segments occurring during the relevant time window that relate to the consumer primary affinities, based on current event real-time data segments received from at least one event data source;

retrieving a list of generic event data segments indicative of generic events, having a corresponding predetermined predicted real-time emotional state of the consumer associated with each generic event;

dynamically associating by the computer each current event real-time data segment for each real-time event with at least one of the predetermined generic event data segments, the predetermined generic event data segments having at least the corresponding predicted real-time emotional state of the consumer;

creating by the computer the real-time data segment list file using results of the associating, such that each real-time event has at least one generic event data segment having the corresponding predicted real-time emotional state of the consumer associated with the generic event;

sending by the computer the real-time data segment list file, including at least the predicted real-time emotional state of the consumer, to the decision engine for use in making an accurate real-time decision regarding content to be delivered to the consumer, the response time from receiving the data segment list file request to sending the data segment list file being less than 500 milliseconds; and generating by the decision engine, in response to receiving the data segment list file, a recommendation of content to be consumed by the consumer or a selection of an advertisement to be shown to the consumer, the content recommendation or advertisement selection being based at least on the predicted real-time emotional state of the consumer.

16. The method of claim 15, wherein the generating the consumer primary affinities list is performed before the receiving the request.

17. The method of claim 15, wherein the decision engine is a content recommendation engine and the real-time decision regarding content to be delivered to the consumer is a recommendation of content to be consumed by the consumer.

18. The method of claim 15, wherein the decision engine is an advertisement selection engine and the real-time decision regarding content to be delivered to the consumer is a selection of an advertisement to be shown to the consumer based on the real-time data segment list file and specified advertiser decision criteria.

* * * * *